United States Patent Office 3,404,190
Patented Oct. 1, 1968

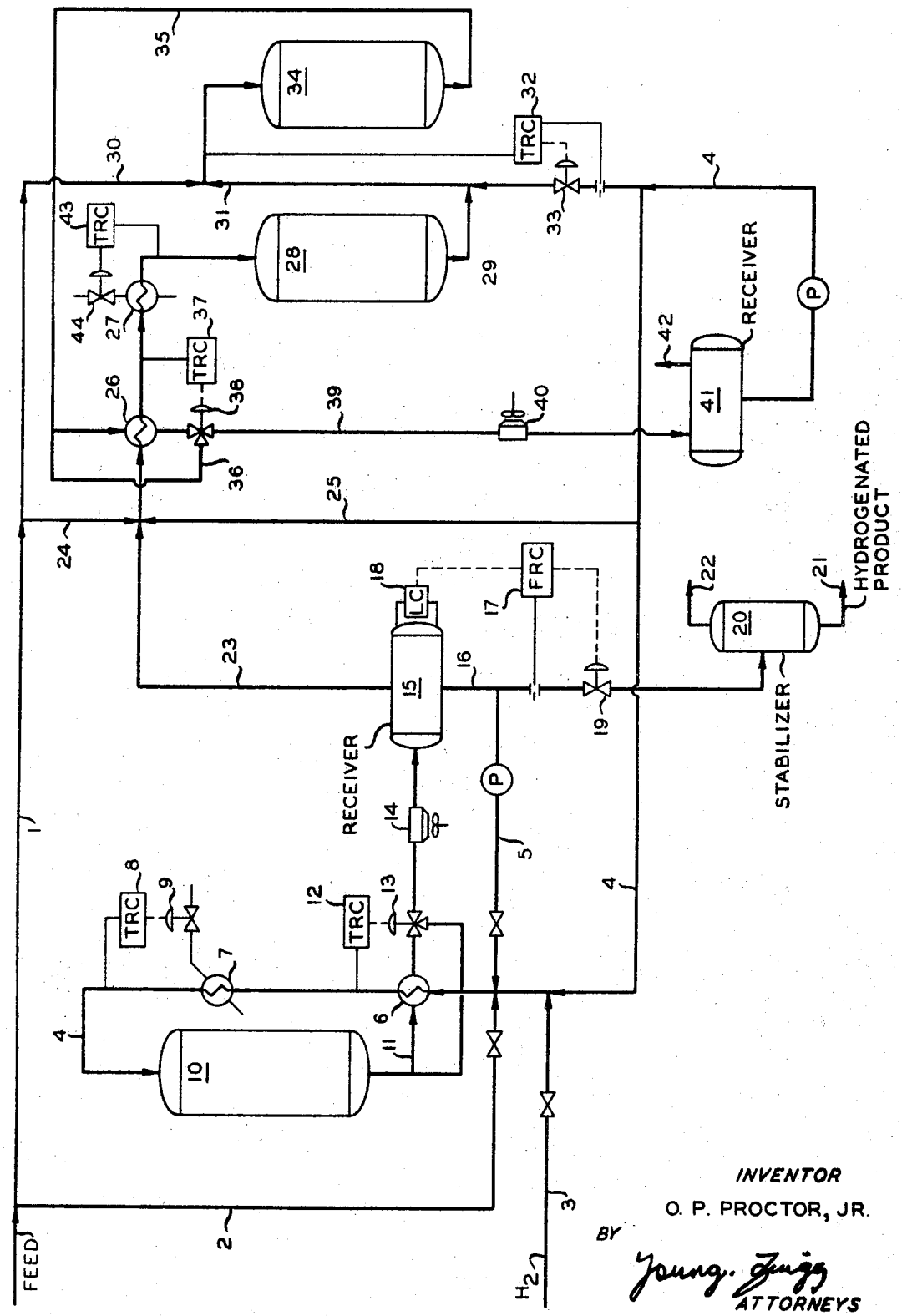

3,404,190
HYDROGENATION
Oliver P. Proctor, Jr., Bartlesville, Okla., assignor to Phillips Petroleum Company, a corporation of Delaware
Filed Feb. 21, 1966, Ser. No. 529,054
2 Claims. (Cl. 260—667)

ABSTRACT OF THE DISCLOSURE

A method of hydrogenating a relatively pure feedstream such as a benzene stream with a relatively impure hydrogen stream wherein the stream of hydrogen is passed serially through at least two hydrogenation zones, and the pure feedstream is passed serially through the hydrogenation zones to form intermediate hydrogenation product streams in a manner so that a first portion of the most hydrogenated intermediate product stream is contacted with the richest hydrogen-containing stream in a hydrogenation zone and a second portion of the most hydrogenated intermediate product stream is recycled to the pure feed stream entering the process.

---

This invention relates to hydrogenation. In one of its aspects, it relates to a process for hydrogenating benzene using low purity hydrogen by passing hydrogen serially through a series of reaction zones, adding to each reaction zone a hydrogenatable hydrocarbon, and removing a hydrogenated product from a first hydrogenation zone. In another aspect, the invention relates to a hydrogenation process as hereinbefore described wherein the effluent from a last hydrogenation zone is recycled and admixed with the feed to at least one of the hydrogenation zones. In a still further aspect, the invention relates to a hydrogenation process wherein benzene is hydrogenated to cyclohexane. In a still further aspect, the invention relates to a hydrogenation process as herebefore described wherein the effluent from a last reaction zone is heat exchanged with the feed to a second reaction zone. In a still further aspect, the invention relates to a hydrogenation process as hereinbefore described wherein the feed to a first reaction zone is heat exchanged with the effluent from the reaction zone. In a still further aspect, the invention relates to an apparatus for carrying out the process of this invention.

Hydrogenation of benzene to cyclohexane with the aid of catalysts such as nickel, platinum, palladium, iron, etc. is well known. However, a pure cyclohexane is difficult to separate from benzene and other impurities because the boiling point of cyclohexane is about the same as the boiling point of benzene and other impurities, thus making a difficult separation by fractionation. Thus, it is desirable to produce a highly pure cyclohexane product.

One prior art process which produces a high purity uses a series of reactors and feeds benzene in parallel into each reactor. Hydrogen and recycle cyclohexane are added to the feed of the first reactor and are passed through each reactor in series. The effluent from one reactor flows directly to the next reactor and the effluent from the final reactor is passed to a receiver wherein gaseous products containing hydrogen are separated from liquid products containing substantially only cyclohexane. The gaseous products are recycled to the first reactor and the liquid cyclohexane is either removed from the system or recycled to the first reactor. In order to produce substantially pure cyclohexane, an excess of hydrogen must be present. Further, in order to make the operation economical, the hydrogen need be recycled, which requires that the hydrogen be recompressed in a compressor.

In copending Ser. No. 394,484, filed Sept. 4, 1964, now U.S. Patent 3,318,965, issued May 9, 1967 there is disclosed and claimed another process for hydrogenating benzene to cyclohexane. In the aforementioned application, a low purity hydrogen can be used and substantially all the hydrogen is used up in the operation. The process is carried out by serially feeding benzene to a plurality of reactors. In the first reactor, benzene is used in excess so that substantially all the hydrogen is used up. Non-combustible gases which may contain some hydrogen are removed from the cooled effluent from the first reactor. The effluent is then fed to a second reactor wherein it is mixed with excess hydrogen to convert substantially all benzene to cyclohexane. The cyclohexane in the effluent is separated from the hydrogen which is then recycled, which recycling requires the use of a compressor. In this copending application, it is indicated that in some areas high purity hydrogen is not available for the hydrogenation processes. Accordingly, it is desirable to develop a process which can utilize the low purity hydrogen.

I have conceived of still another efficient method of hydrogenating benzene to cyclohexane, which method can be used with a low purity hydrogen supply. The method includes feeding, in parallel, to a series of reaction zones, benzene, feeding hydrogen serially to the series of reaction zones and removing product cyclohexane from the effluent from the first reaction zone. This method removes substantially pure cyclohexane product, thus minimizing contamination from benzene, and eliminates the use of a compressor to recycle hydrogen.

By various aspects of this invention, one or more of the following or other objects can be obtained.

It is an object of this invention to provide a process and apparatus for producing high purity cyclohexane using low purity hydrogen.

It is a further object of this invention to provide a process and apparatus wherein substantially all hydrogen is used without recycling the hydrogen and the use of a compressor.

It is a still further object of this invention to provide a hydrogenation process and apparatus wherein contamination of cyclohexane from benzene is minimized.

Other aspects, objects, and the several advantages of this invention are apparent to one skilled in the art from a study of this disclosure, the drawing and the appended claims.

According to the invention, a hydrogenatable hydrocarbon is hydrogenated by passing hydrogen in series through a plurality of reaction zones, adding benzene to each zone, and removing hydrogenated product from the effluent of the first hydrogenation zone.

In one embodiment of the invention, the effluent from a last reaction zone is cooled, non-condensibles are removed and the liquid product is recycled to at least one reaction zone.

The invention can be further described by reference to the drawing which shows an embodiment of the invention as applied to hydrogenation of benzene to cyclohexane.

Referring now to the drawing, which will be described with regard to the hydrogenation of benzene to cyclohexane, hydrogen is introduced into the system through line 3. Cyclohexane containing benzene contaminant in line 4 is admixed with an excess of hydrogen in line 3. The admixture is passed through heat exchanger 6 wherein it is heated, through heat exchanger 7 wherein it is further heated, and into reactor 10 which preferably contains a catalyst suitable for initiating the hydrogenation reaction of the trace quantities of benzene to cyclohexane. Normally no benzene or only a small quantity of benzene is added by way of conduit 2. Temperature recorder controller 8 controls the amount of heat supplied to heat exchange 7 by regulating valve 9 in accordance with the temperature sensed in line 4. The effluent from reactor 10 passes through line 11, heat exchanger 6, cooler 14 which preferably is an air fin cooler, and into receiver 15. Temperature recorder controller 12 controls the amount of heat supplied to line 4 through heat exchanger 6 by regulating valve 13 in accordance with the temperature sensed in line 4 downstream from heat exchanger 6. The conditions in reactor 10 are such that there is present such an excess of hydrogen so that all of the benzene is substantially completely converted to cyclohexane. Thus, the liquid product removed from receiver 15 through line 16 is substantially pure cyclohexane. A portion of this pure cyclohexane can be recycled to the operation through line 5. The other portion of the cyclohexane product passes through line 16 to stabilizer 20 wherein pure cyclohexane product, removed from stabilizer 20 through line 21, is separated from impurities which leave the stabilizer through line 22. The flow of product through line 16 is regulated by flow recorder controller 17 which operates valve 19 in accordance with the liquid level sensed by liquid level sensor 18 in receiver 15. Non-condensible gases in receiver 15, the gases consisting primarily of hydrogen and methane, are passed through line 23 into admixture with benzene in line 24, and recycle product comprising cyclohexane contaminated with benzene through line 25. The mixture is heated in heat exchanger 26, heat exchanger 27 and passed to reactor 28 in which benzene is catalytically hydrogenated to cyclohexane. Reactor 28 can be similar to reactor 10, however, due to the nature of the process, reactor 10 need not be as large as reactor 28. The effluent from reactor 28 passes through line 29 into admixture with more benzene feed through line 30 and more recycle product comprising cyclohexane contaminated with benzene through line 31. The admixture then passes to reactor 34 wherein substantially all of the hydrogen in the feed is used up in converting the benzene to cyclohexane.

The heating of feed downstream from heat exchanger 27 is controlled by temperature recorded controller 43 which adjusts valve 44 responsive to the temperature sensed in the feed line downstream from the heat exchanger 27. Similarly, the heating in heat exchanger 26 can be controlled by temeperature recorder controller 37 which adjusts valve 38 to by-pass more or less liquid through line 36 according to temperature sensed in the feed line between heat exchanger 26 and heat exchanger 27.

The effluent from reactor 34 containing primarily cyclohexane and benzene contaminant, along with some non-condensible gases such as methane along with some hydrogen, is passed through line 35 and cooled in heat exchanger 26, through line 39, air fin cooler 40 and receiver 41. Due to the nature of the process, since no hydrogen need be recycled, an air fin cooler is suitable for cooling the effluent in line 35. The non-condensible gases can be removed from the system through line 42, whereas the liquid product containing cyclohexane and contaminating benzene is recycled through line 4 to reactors 10, 28 and 34.

Whereas the process has been described with regard to three reactors, it is obvious that two reactors could also be used in carrying out the process. In a two reactor process, reactors 28 and 34 would be combined, thus eliminating line 29. Further, it is within the scope of the invention to include more than three reactors or reaction zones in carrying out the invention. Thus, more reactors such as reactor 34 could be added onto the process as hereinbefore described.

As mentioned before, due to the fact that a relatively small amount of benzene (that is, only benzene contaminant normally) is converted to cyclohexane in reactor 10, reactor 10 can be relatively smaller than reactors 28 and 34, thus allowing for a reduction in equipment cost. Further, it is obvious that the process seeks to use up substantially all of the hydrogen without recycle. This permits the use of a low quality hydrogen which is the only hydrogen available at some sources, while still producing a substantially pure cyclohexane product. The pure cyclohexane product is drawn off the system at a point wherein the hydrogen to benzene ratio is the highest. Thus, conditions at that point (reactor 10) are most favorable for reducing benzene content in the product which is removed through line 16.

As mentioned before, substantially all of the hydrogen can be used up in the process without recycling. Elimination of recycling of hydrogen avoids the use of a hydrogen compressor, thus reducing the equipment cost. In this process, equipment cost is further reduced by the use of the air fin coolers 40 and 14. The alternate type of cooler would be a water heat exchanger which is more costly than the air fin cooler.

EXAMPLE

| | (1) | To reactor (28) | | | To reactor (34) | | | | To reactor (10) | | | | | |
|---|---|---|---|---|---|---|---|---|---|---|---|---|---|---|
| | | (24) | (25) | (23) | (29) | (30) | (31) | (35) | (2) | (4) | (3) | (21) | (22) | (42) |
| Stream component | Total benzene | Benzene feed | $C_yC_6$ recycle | $H_2$ feed | Effluent | Benzene feed | $C_yC_6$ recycle | Effluent | Benzene feed | $C_yC_6$ recycle | Hydrogen | $C_yC_6$ product | Stab OHD | Off-gas |
| Hydrogen | | | 1.89 | 911.35 | 456.58 | | 0.50 | 83.43 | | 0.48 | 913.34 | | 2.47 | 80.56 |
| Methane | | | 49.55 | 371.07 | 420.62 | | 13.08 | 433.70 | | 12.63 | 362.81 | 0.36 | 4.01 | 358.44 |
| Benzene | 276.77 | 152.22 | (t) | | | 124.55 | (t) | | | (t) | | | | |
| Cyclohexane | | | 1,313.05 | 61.70 | 1,526.97 | | 346.47 | 1,997.99 | | 334.93 | | 273.04 | 0.19 | 3.54 |
| Total (# mols per unit of time) | 276.77 | 152.22 | 1,364.49 | 1,344.12 | 2,404.17 | 124.55 | 360.05 | 2,515.12 | (w) | 348.04 | 1,276.15 | 273.40u | 6.67v | 442.54 | t is trace.
u is 99.86 percent cyclohexane purity.
v is 18.2 percent hydrogen purity.
w is normally none or small flow.

Reasonable variation and modification are possible within the scope of the foregoing disclosure, the drawing, and the appended claims to the invention, the essence of which is that there has been provided an improved process and apparatus for hydrogenating a hydrocarbon in which the hydrocarbon is fed in parallel to a series of reactors, hydrogen is fed serially to the plurality of reactors so that hydrogen is in excess in the first reactor, thus converting substantially all of the hydrocarbon in the first reactor to a hydrogenated hydrocarbon, and removing the product from the effluent of the first reactor.

I claim:

1. A process for hydrogenating a first stream consisting essentially of benzene with a second stream containing hydrogen and at least about 28 mole percent vaporous impurities wherein substantially all of the hydrogen added to the system can be used up without recycle of said hydrogen, said process comprising:
   (a) continuously passing said second stream serially through a first and second hydrogenation zone respectively;
   (b) continuously passing said first stream through said second hydrogenation zone to form an intermediate hydrogenated product stream containing cyclohexane;
(c) passing a first portion of said intermediate hydrogenated product stream to said first feedstream entering said second hydrogenation zone;
(d) passing a second portion of said intermediate hydrogenated product stream through said first hydrogenation zone;
(e) removing a cyclohexane product stream from said first hydrogenation zone.

2. A process of hydrogenating a first feedstream consisting essentially of benzene with a second feedstream containing hydrogen and at least about 28 mole percent vaporous impurities wherein substantially all of the hydrogen added to the system can be used up without recycle of said hydrogen, said process comprising:
(a) continuously passing said second feedstream serially through first, second, and third hydrogenation zones respectively;
(b) continuously passing a first portion of said first feedstream through said second hydrogenation zone, and a second portion of said first feedstream through said third hydrogenation zone;
(c) withdrawing a first intermediate hydrogenated stream containing cyclohexane from said second hydrogenation zone and then passing it to said second portion of said first feedstream;
(d) withdrawing a second intermediate hydrogenated stream containing cyclohexane from said third hydrogenation zone and passing a first portion of said second intermediate hydrogenated stream to said second portion of said first feedstream, passing a second portion of said second intermediate hydrogenated stream to said first portion of said first feedstream, and passing a third portion of said second intermediate hydrogenated stream through said first hydrogenation zone;
(e) withdrawing a cyclohexane product stream from said first hydrogenation zone.

References Cited

UNITED STATES PATENTS

| | | | |
|---|---|---|---|
| 2,833,698 | 5/1958 | Patton et al. | 208—210 |
| 3,254,134 | 5/1966 | Smith et al. | 260—667 |
| 3,341,613 | 9/1967 | Hann | 208—143 |

DELBERT E. GANTZ, *Primary Examiner.*

V. O'KEEFE, *Assistant Examiner.*